United States Patent [19]
Probst

[11] 3,936,076
[45] Feb. 3, 1976

[54] CYCLE SHOCK ABSORBER

[76] Inventor: Kendall D. Probst, 935 20th St., Ogden, Utah 84401

[22] Filed: Aug. 23, 1974

[21] Appl. No.: 500,050

[52] U.S. Cl. ............................. 280/276; 267/147
[51] Int. Cl.² ....................................... B62K 21/18
[58] Field of Search ............ 267/147, 132; 280/276, 280/283

[56] References Cited
UNITED STATES PATENTS

| | | | |
|---|---|---|---|
| 1,188,168 | 6/1916 | Genovese | 280/276 |
| 1,429,107 | 9/1922 | Sage, Jr. | 280/276 |
| 2,462,316 | 2/1949 | Goodloe | 267/147 |
| 2,623,573 | 12/1952 | Di Gaetano | 280/283 |

Primary Examiner—James B. Marbert
Attorney, Agent, or Firm—Criddle & Thorpe

[57] ABSTRACT

A shock absorber for use in combination with either or both a seat post and front wheel fork of bicycles and the like. The shock absorber includes a pair of elongated tubes adapted to fit together in a telescopic fashion. The wall of each tube has a pair of slots on opposite sides of the tube so that when the tubes are fitted together, the slots are in general alignment. Plugs are fitted in each tube to compress therebetween a resilient wire mesh pad. A tab is fitted in the slots to keep the tubes together and to enable the tab to slide in the slots of the interior tube as the tubes slide relative to each other. The wire mesh pad serves to absorb vibrations and shocks applied to either tube.

5 Claims, 3 Drawing Figures

CYCLE SHOCK ABSORBER

BACKGROUND OF THE INVENTION

This invention relates to shock absorbers and more particularly to a shock absorber construction especially suitable for bicycles and the like.

Shock absorbers and cushioning arrangements heretofore suggested for bicycles and other lightweight cycles have typically employed rather complicated coil spring configurations and in some instances pneumatic apparatus. Although such arrangements have been found generally acceptable for cushioning vibrations, etc., the complexity of construction made such configurations undesirable from a manufacturing cost standpoint.

SUMMARY OF THE INVENTION

It is an object of the present invention to provide a simple, easy to construct and yet effective shock absorber for use with bicycles and the like.

It is also an object of the present invention to provide such a shock absorber having relatively few component parts.

It is another object of the present invention to provide such a shock absorber which is light in weight and yet rugged.

It is still another object of the present invention to provide such a shock absorber which rapidly dampens vibrations of substantially any magnitude.

The above and other objects of the present invention are realized in an illustrative embodiment which includes first and second elongated tubes fitted together in a telescopic fashion, each tube having a pair of slots located on opposite sides of the tube. The slots in the interior tube are longer than the slots of the exterior tube but are generally aligned therewith. A plug is positioned in the end of the interior tube and another plug is positioned some distance from the end of the exterior tube. A compressable wire mesh pad is disposed in the exterior tube between the two plugs so as to be compressed therebetween. A tab extends between the slots in the exterior tube through the slots in the interior tube to prevent rotational movement of one tube relative to the other while allowing linear movement of the tubes with respect to each other. That is, upon linear movement of one tube with respect to the other, the tab will reciprocate within the slot of the interior tube.

BRIEF DESCRIPTION OF THE DRAWINGS

The above and other objects, features and advantages of the present invention will become apparent from the following detailed description presented in connection with the accompanying drawings, in which.

DETAILED DESCRIPTION

Figure 1:
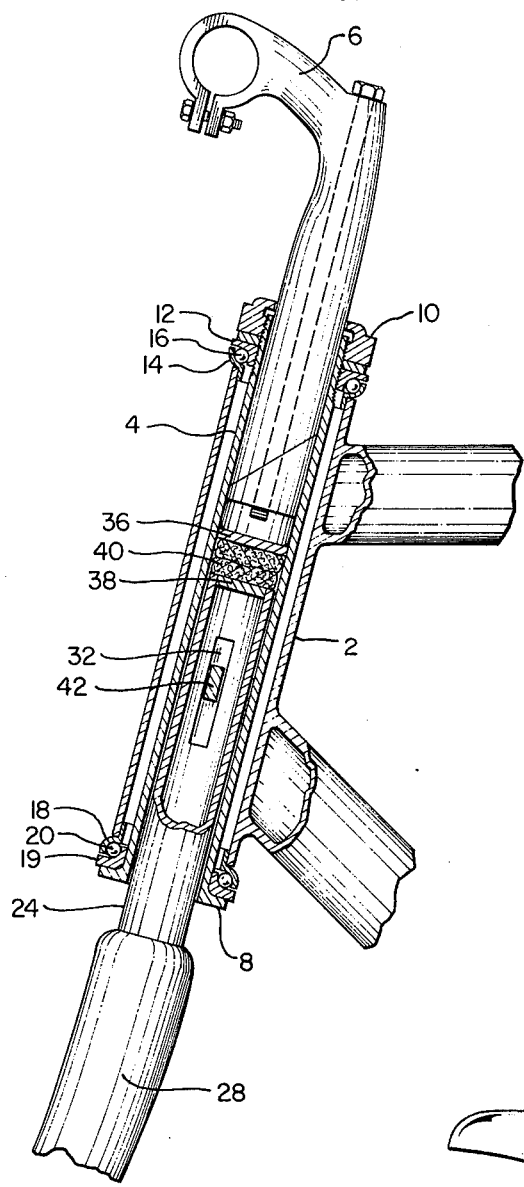
FIG. 1 is a side cross-sectional view of a shock absorber made in accordance with the principles of the present invention and incorporated in a tubular steering head of a bicycle.

Referring to FIG. 1 there is shown a cross-sectional view of one embodiment of the shock absorber of the present invention mounted in a tubular steering head 2 of a bicycle frame. The shock absorber includes an exterior elongated tube 4, the upper end of which is coupled to a bicycle handlebar support 6. The tube 4 is maintained within the steering head 2 by a collar 8 integrally formed in the lower part of the tube 4 and a locking nut 10 fitted onto the upper threaded portion of the tube 4. Bearing cups 12 and 14 are fitted between the top of the steering head 2 and the locking nut 10 to define a race for ball bearings 16. Bearing cups 18 and 19 and ball bearings 20 are fitted in a similar fashion between the bottom of the steering head 2 and the collar 8. As can be seen from FIG. 1, when the locking nut 10 is secured in place about the tube 4, the tube 4 is secured within the steering head 2 but may be rotated therein. The particular structure for mounting the shock absorber of the present invention in the steering head of a bicycle is not of concern and the particular structure described is provided only for purposes of illustration.

The shock absorber of FIG. 1 further includes an interior tube 24, one end of which is slidably fitted within the tube 4 in a telescopic fashion. The lower end of the tube 24 is attached to a conventional front fork 28 of a bicycle. The exterior tube 4 includes a pair of slots 30 positioned on either side of the tube (i.e., 180° apart). The interior tube 24 similarly includes a pair of slots 32 disposed on opposite sides of the tube. The slots 32 of the tube 24 are longer than the slots in the tube 4 for reasons which will become clear momentarily.

A plug 36 is secured in the tube 4 a certain distance above the slot 30 and a plug 38 is secured in the upper end of the tube 24. These plugs are simply round, generally flat discs welded or soldered in place in the respective tubes. A pair of wire mesh pads 40, formed into discs, are placed in the exterior tube 4 between the two plugs 36 and 38 as generally shown in FIG. 1. The wire mesh pads might illustratively be made of stainless steel wire woven into a mesh, crimped and then rolled into pads. The use of wire mesh material for shock absorbing purposes has been described in A. M. Goodloe, U.S. Pat. No. 2,462,316.

Figure 2:
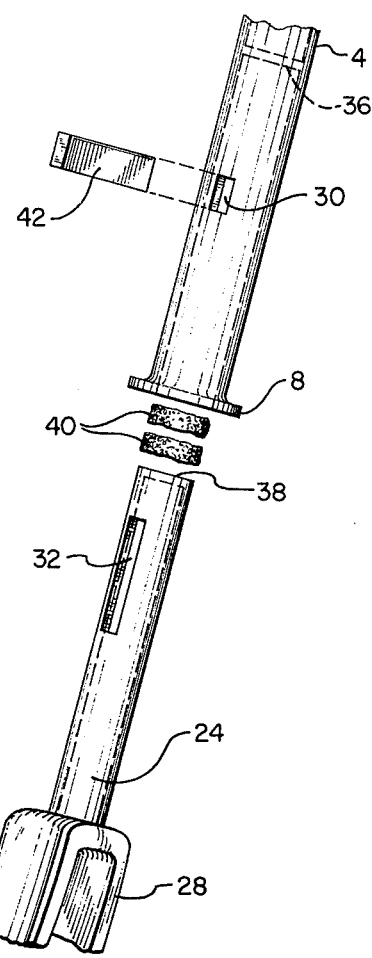
FIG. 2 is an exploded view of the shock abosorber of FIG. 1.

A tab or key 42 (FIG. 2) is inserted in the slots 30 and 32 of both tubes 4 and 24 to extend between the slots 30 and through the slots 32. The tab 42 is dimensioned to snuggly fit in the slots 30 and to be slidable in the slots 32 so that when the tubes 4 and 24 move linearly with respect to each other, the tab 42 slides in the slots 32. The tab 42 would illustratively be soldered into the slots 30 of the tube 4.

The slots 30 and 32 are positioned such that the tab 42 cannot be inserted into the slots until the wire mesh pads 40 have been compressed (for example to a pressure of 110 p.s.i.) between the plugs 36 and 38. The pads 40 thereby bias the tube 24 downwardly of the tube 4.

Forces delivered upwardly against the tube 24 will cause the tube to move upwardly within the tube 4 so that the slots 32 slide longitudinally of the tab 42. The wire mesh pads 40 are further compressed as the tube 24 is moved upwardly but the resiliency of the pads will cause the tube 24 to again move downwardly. In this manner, the tube 24 will reciprocate within the tube 4 to absorb and cushion shocks and jolts of the front wheel of a bicycle or like apparatus.

Figure 3:
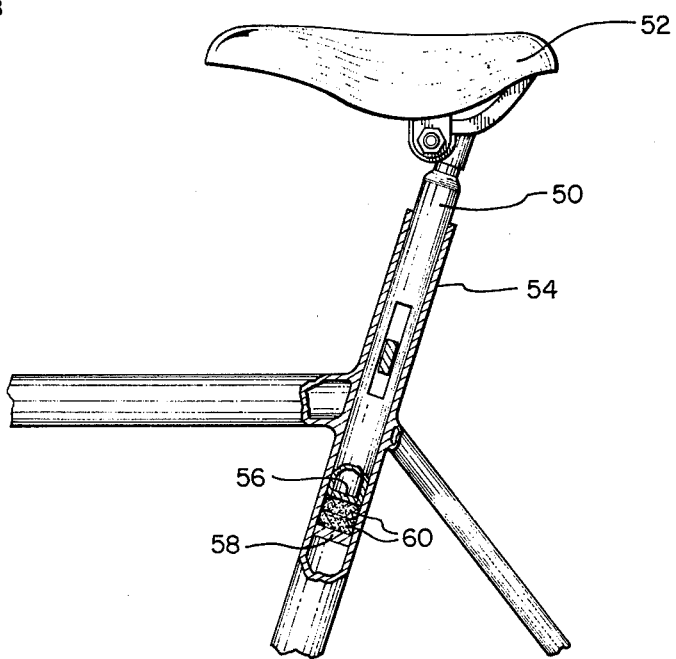
FIG. 3 is a side cross-sectional view of a shock absorber made in accordance with the principles of the present invention and incorporated in the seat post of a bicycle.

FIG. 3 shows the shock absorber of the present invention embodied in a seat post structure of a bicycle. In this embodiment, one end of an interior tube 50 is attached to and supports a bicycle seat 52 and the other end of the tube 50 is fitted within an exterior tube 54. Again, a plug 56 is secured in the end of the interior tube 50 and a plug 58 is secured in the exterior tube 54 at a point some distance from the end of the tube. Wire mesh pads 60 are positioned between the plugs 56 and 58 to cushion and absorb the shocks transmitted, for example, by a bicycle rider to the seat 52 of the bicycle.

The shock absorber shown and described is simple in construction, having few component parts, and yet suitably functions to absorb and dampen shocks. The tubes can move longitudinally relative to each other to compress and allow expansion of the wire mesh pads, but the tab prevents rotation of the tubes relative to each other. By using the shock absorber on bicycles as shown and described to dampen vibrations, bicycle frames and forks may be constructed to have a higher flexual stiffness (without increasing the discomfort to the rider) to improve the bicycles handling, braking and accelerating qualities.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements. One such arrangement might include providing two pairs of slots positioned side by side and two tabs in the telescoped tubes. This construction would afford a reliability advantage since if one tab wore out, the other tab would continue to prevent rotation of the tubes relative to each other while at the same time allowing linear movement therebetween. Another arrangement might include providing only a single slot in the interior tube and a tab extending from the inner wall of the exterior tube into the slot to slide therewithin.

What is claimed is:

1. A shock absorber comprising
    a first elongated tube having a first pair of slots on opposite sides of the tube near one end thereof,
    a second elongated tube, one end of which slidably fits in said one end of the first tube, said second tube having a second pair of slots on opposite sides and extending lengthwise of the second tube and generally aligned with the first pair of slots, the second pair of slots being longer than the first pair,
    a first plug secured in said first tube between the first pair of slots and the other end of the tube,
    a second plug secured in said second tube at said one end,
    at least one resilient wire mesh pad disposed in said first tube between said first and second plugs and partly compressed therebetween, and
    a tab secured in and extending between the first pair of slots through the second pair of slots such that the tab slides in the second pair of slots as the first and second tubes move relative to each other.

2. A shock absorber as in claim 1 wherein said first elongated tube is disposed in a tubular steering head of a cycle and is coupled to the handlebars of the cycle, and wherein the second elongated tube is coupled to the front fork of the cycle.

3. A shock absorber as in claim 1 wherein said first elongated tube is mounted on a cycle frame, and wherein said second elongated tube is attached to a cycle seat.

4. A shock absorber for use in bicycles and the like comprising
    an exterior tube having a pair of oppositely disposed slots in the walls thereof,
    an interior tube, one end of which is fitted into one end of the exterior tube, said interior tube having a pair of oppositely disposed slots in the walls thereof, the slots in said interior tube being generally aligned with the slots in the exterior tube,
    a first plug fixed in said exterior tube above the slots,
    a second plug fixed in the interior tube at said one end thereof,
    at least one resilient wire mesh pad positioned in the exterior tube between the first and second plugs to be partly compressed therebetween, and
    a tab extending between the slots of the exterior tube and through the slots of the interior tube and slidable longitudinally in the slots of the interior tube as the exterior and interior tubes move relative to each other.

5. A shock absorber comprising
    an exterior tube having a tab extending inwardly from the inner wall of the tube,
    an interior tube, one end of which is fitted into one end of the exterior tube, said interior tube having at least one slot in the wall thereof for receiving said tab,
    a first plug fixed in said exterior tube between the tab and the end of the tube opposite said one end,
    a second plug fixed in the interior tube at said one end thereof,
    at least one resilient wire mesh pad positioned in the exterior tube between the first and second plugs, and
    said tab preventing rotation of either tube relative to the other while being slidable in said slot as said tubes are moved longitudinally of each other.

* * * * *